US009411988B2

(12) United States Patent
Berthiaud et al.

(10) Patent No.: US 9,411,988 B2
(45) Date of Patent: Aug. 9, 2016

(54) DETECTION OF A TRANSACTIONAL DEVICE

(71) Applicant: Ingenico Group, Paris (FR)

(72) Inventors: Olivier Berthiaud, Cornas (FR); Michel Rossignol, Monteleger (FR)

(73) Assignee: INGENICO GROUP, Paris (FR)

( * ) Notice: Subject to any disclaimer, the term of this patent is extended or adjusted under 35 U.S.C. 154(b) by 0 days.

(21) Appl. No.: 14/654,793

(22) PCT Filed: Dec. 30, 2013

(86) PCT No.: PCT/EP2013/077598
§ 371 (c)(1),
(2) Date: Jun. 22, 2015

(87) PCT Pub. No.: WO2014/096315
PCT Pub. Date: Jun. 26, 2014

(65) Prior Publication Data
US 2015/0347789 A1    Dec. 3, 2015

(30) Foreign Application Priority Data
Dec. 21, 2012    (FR) .................................... 12 62728

(51) Int. Cl.
*G06K 7/00*     (2006.01)
*G06K 19/06*    (2006.01)
(Continued)

(52) U.S. Cl.
CPC ............ *G06K 7/0004* (2013.01); *G06K 7/0013* (2013.01); *G06K 7/087* (2013.01); *G06K 7/10297* (2013.01)

(58) Field of Classification Search
USPC .......................... 235/380–383, 440, 451, 492
See application file for complete search history.

(56) References Cited

U.S. PATENT DOCUMENTS

| 5,796,083 A * | 8/1998 | Kenneth ............... G06K 7/0013 235/380 |
| 5,929,414 A * | 7/1999 | Saitoh ................. G06K 7/0004 235/380 |

(Continued)

FOREIGN PATENT DOCUMENTS

KR    20070075724 A    7/2007

OTHER PUBLICATIONS

International Search Report dated Jan. 28, 2014 for corresponding International Application No. PCT/EP2013/077598, filed Dec. 20, 2013.

(Continued)

*Primary Examiner* — Tuyen K Vo
(74) *Attorney, Agent, or Firm* — David D. Brush; Westman, Champlin & Koehler, P.A.

(57) ABSTRACT

A terminal includes first and second communication modules for communicating with a personal device for performing transactions, called a transactional device. The first communication module includes a contact reading interface, and the second communication module includes a contact-free reading interface. The terminal also includes a detection module including: at least one transactional device position sensor, delivering an item of data representative of a position of a transactional device relative to the terminal; and at least one control module for controlling at least one communication module of the first and second communication modules, the at least one control module activating the communication module on the basis of the item of data representative of the position of the transactional device.

13 Claims, 3 Drawing Sheets

(51) Int. Cl.
*G06K 7/08* (2006.01)
*G06K 7/10* (2006.01)

(56) References Cited

U.S. PATENT DOCUMENTS

| | | | | |
|---|---|---|---|---|
| 6,321,067 | B1* | 11/2001 | Suga | G06K 7/0008 455/106 |
| 2006/0022046 | A1* | 2/2006 | Iwamura | G06K 7/0008 235/451 |
| 2007/0080231 | A1* | 4/2007 | Tadamasa | G06K 7/0004 235/475 |
| 2007/0204055 | A1* | 8/2007 | Oishi | G06F 13/385 709/230 |
| 2007/0205282 | A1* | 9/2007 | Nakabo | G06K 7/0004 235/451 |
| 2009/0289117 | A1* | 11/2009 | Lu | G06K 7/10217 235/440 |
| 2010/0163617 | A1* | 7/2010 | Ito | G01C 21/3697 235/380 |
| 2013/0203163 | A1* | 8/2013 | Wollan | C07K 14/535 435/348 |
| 2013/0299574 | A1* | 11/2013 | Theobald | G06Q 20/34 235/380 |

OTHER PUBLICATIONS

English translation of the International Written Opinion dated Jan. 28, 2014 for corresponding International Application No. PCT/EP2013/077598, filed Dec. 20, 2013.

* cited by examiner

DETECTION OF A TRANSACTIONAL DEVICE

1. CROSS-REFERENCE TO RELATED APPLICATIONS

This application is a Section 371 National Stage Application of International Application No. PCT/EP2013/077598, filed Dec. 20, 2013, the content of which is incorporated herein by reference in its entirety, and published as WO 2014/096315 on Jun. 26, 2014, not in English.

2. FIELD OF THE INVENTION

The field of the invention is that of card reader terminals.

More specifically, the invention relates to a technique for selecting a mode of communications to be used to communicate with a customer card, for example a bankcard.

The invention has many applications such as for example in the field of money systems (i.e. bank payment terminals) or tickets for travel.

More generally, it can be applied to all cases where it is necessary to communicate optimally with a card.

3. TECHNOLOGICAL BACKGROUND

We shall strive more particularly here below in the document to describe the set of problems and issues in the field of bank terminals faced by the inventors of the present patent application. The invention is of course not limited to this particular field of application but is of interest for any smart-card reading technique that has to cope with proximate or similar problems and issues.

The EMVco (Europay, MasterCard, Visa & Co) standard provides for the possibility of a smart-card or payment terminal having a plurality of communications modes. Thus, a payment terminal can include different communications means requiring physical contact with the card for example (via a track, or a micromodule) as well as different contactless communications means (compatible with standards related to NFC (near field communications) or RFID (radio frequency identification) that work separately.

Thus, depending on the card presented, such a reader should be capable of selecting the appropriate mode of communications (and therefore the corresponding communications means) to carry out a bank transaction.

Classically, when the presented card is inserted into a first reading slot of the terminal, this terminal implicitly selects first means of communications with contact (via a micromodule). When the presented card is inserted into a second reading slot of the terminal, comprising a magnetic head, this terminal implicitly selects second communications means with contact (magnetic reading head). Finally, when the card presented is proximate (by about a few centimeters) to an emitter of a terminal corresponding to a contactless communications module (and more specifically within the range of such an emitter) and when the card transmits a response to the terminal following the activation of the contactless communications means, this terminal selects a contactless communications means to communicate with the card presented.

Thus, to enable such a selection, the contactless communications means of the terminal are often activated permanently (or else they are activated at regular intervals as in certain techniques in which the contactless communications means are used in emitting short pulses to try and detect the presence of a card) to comply with the constraints of implicit selection of the mode of payment by the user (a regulatory constraint in France for example).

Now, when a user wishes to insert a combined card (i.e. a card comprising a communications module that is both contactless and with contact), into the first or second reading slot, it can happen that this user brings the combined card close to the emitter of the terminal during this phase for approaching one of the slots, and that the combined card will perform a transaction before being positioned in one of the slots. The payment terminal can then cause an error because it is generally not permitted to simultaneously process two card "readings". Thus, when the combined card passes into proximity with the contactless emitter of the terminal, the energy provided by the electromagnetic field of the emitter of the terminal activates the contactless communications means of the combined card. Then, the combined card transmits a piece of information specifying that it can carry out an electronic transaction through the contactless communications means. It is from the instant of reception of such a piece of information by the terminal that the total time of a transaction is tracked by the terminal. Thus, one drawback of such a technique lies in the fact that, in addition to the total time of the transaction itself, there is also a period of time resulting from the activation and the emitting, by the combined card, of a piece of information specifying that it is capable of carrying out an electronic transaction via the contactless communications means.

Contactless card reader must operate at distances of several centimeters, whatever the type of user card. To ensure that the different readers are simultaneously operational, it is therefore necessary to move them away from each other by more than five to ten centimeters, and this becomes impossible for compact items.

Another drawback related to the permanent activation of a contactless communications module of the terminal lies in the fact that the terminal needs a substantial energy supply (owing to the increase in consumption induced by the permanent working of a contactless communications module of the terminal), leading to constraints in the sizing of the power supplies of such a terminal, as well as problems of heating and autonomy for portable terminals.

4. SUMMARY OF THE INVENTION

The invention does not have the drawbacks of the prior art. More particularly, the invention relates to a terminal comprising communications means of communication with a personal device for carrying out transactions, called a transactional device, said communications means comprising a first communications module comprising a reading interface for reading by contact, and a second communications module comprising a contactless reading interface, said terminal being characterized in that it comprises a detection module comprising:

at least one transactional device position sensor delivering a piece of data representing a position of a transactional device relative to said terminal; and at least one control module for controlling at least one communications module among said first and second communications modules, said at least one control module activating said communications module according to said piece of data representing said position of said transactional device.

Thus, when a user brings a transactional device (for example a mobile card or terminal) closer to the terminal and when said at least one detection module detects, through at least one sensor, a position of the transactional device associated (implicitly) with a choice of using either the first communications module or of the second communications module, said at least one control module is activated: in the example where the transactional device is to communicate with the first communications module, said at least one control module can leave the second communications module in the off state or only reduce the intensity of the second communications module. It can also be possible to increase the level of energy allocated to the first module (passing from a "sleeping" mode to an active mode); in the example where the transactional device is to communicate with the second module, said at least one control module can leave the first communications module in the off state, or only reduce the intensity of the first communications module. It can also be possible to increase the energy level allocated to the second communications module (passing from a "sleeping" mode to an active mode).

According to one particular characteristic, said sensor comprises at least one optical sensor.

Thus, such an optical sensor is used for the precise detection of the position of the transactional device. In particular, such a sensor makes it possible to distinguish a transactional device from another object and thus avoid having to use a control module without valid reason.

According to one particular embodiment, said terminal comprises a plurality of detection modules, each detection module comprising at least one sensor, which is adapted to the detection of the position of a transactional module according to predetermined constraints related to said communications module with which said detection module is associated.

Thus, by using a plurality of detection modules, the terminal is able to control the first and/or second communications modules with the utmost efficiency.

According to one particular characteristic, each detection module of said plurality of detection modules is capable of controlling the communications means associated with said detection module.

Thus, each detection module of the terminal is associated either with said first means or with said second communications means. Hence, such dedicated detection modules thus distributed can detect all the positions of interest of a transactional device. In one variant, a detection module comprises a plurality of sensors thus making it possible to refine the detection of a position of the transactional device.

According to one particular embodiment, the sensor of the detection module, namely a sensor that is associated with said second communications module, is positioned on the surface of the screen of said terminal.

Thus, the terminal can communicate with a transactional device even when said first and second communications modules are proximate. Such an architecture cannot be done according to the prior art.

According to one particular embodiment, said first communications module comprises a magnetic read head and/or an interface of electrical contacts.

According to one particular characteristic, said second communications module is compatible with at least any one of the following standards: ISO/CEI 18092, ISO/CEI 14443-1 to ISO/CEI 14443-4 and NDEF.

According to one particular characteristic, said terminal is a payment terminal and said at least one control module can initiate an electronic transaction.

Thus, unlike in the prior-art techniques, it is the terminal, through said at least one control module and not the transactional device that "initiates" an electronic transaction following the detection of a positioning of the transactional device and does so without waiting for a piece of information sent by the transactional device.

According to one particular embodiment, said at least one control module reduces or increases an electrical consumption of one of said communications modules.

According to one particular characteristic, said at least one control module enables the activating or stopping of one module of said communications modules.

Another embodiment of the invention proposes a computer program product comprising program code instructions for implementing the above-mentioned method in any one of its different embodiments, when said program is executed on a computer.

Another embodiment of the invention proposes a computer-readable and non-transient storage medium storing a computer program comprising a set of instructions executable by a computer to implement the above-mentioned method (in any one of its different embodiments).

According to one embodiment, the invention is implemented by means of software and/or hardware components. This implies that, in this document, the term "module" can correspond equally well to a software component and to a hardware component or to a set of hardware and software components.

A software component corresponds to one or more computer programs or to several sub-programs of a program or more generally to any element of a program or a software program capable of implementing a function or a set of functions according to what is described here below for the concerned module. Such a software component is executed by a data processor of a physical entity (terminal, server, gateway, router, etc) and is capable of accessing the hardware resources of this physical entity (memories, recording carriers, communications buses, input/output electronic boards, user interfaces, etc).

Similarly, a hardware component corresponds to any element of a hardware unit capable of implementing a function or a set of functions according to what is described here below for the concerned module. It can be a programmable hardware component or with an integrated processor for the execution of software, for example an integrated circuit board, a smart card, a memory card, an electronic card for executing firmware, etc.

5. LIST OF FIGURES

Other features and advantages of the invention shall appear from the following description of a preferred embodiment, given by way of an indicatory and non-exhaustive example and from the appended figures, of which:

FIGS. 1(*a*) and 1(*b*) present a payment terminal according to the prior art in which the present invention can be implemented;

FIG. 1(*c*) presents another payment terminal according to the prior art comprising, in addition to the technical characteristics of the terminal presented in FIGS. 1(*a*) and 1(*b*), a line of small green lights positioned in proximity to a display screen, in which the present invention can be implemented;

FIGS. 2(*a*), 2(*b*), 2(*c*), 2(*d*) and 2 (*e*) present different embodiments of the present invention;

6. DETAILED DESCRIPTION

In all the figures of the present document, the identical elements and steps are designated by a same numerical reference.

Here below in the description, a transactional device shall be considered to correspond to a combined card. However, those skilled in the art would naturally be able to adapt the present technique to the example where a transactional device corresponds to a portable telephone or to any other electronic device comprising means equivalent to those of a combined card. For example a mobile terminal can comprise a contactless communications module (of the NFC type) as well as a communications module with contact (via a connection by a USB port or the like).

Figures 1A, 1B:
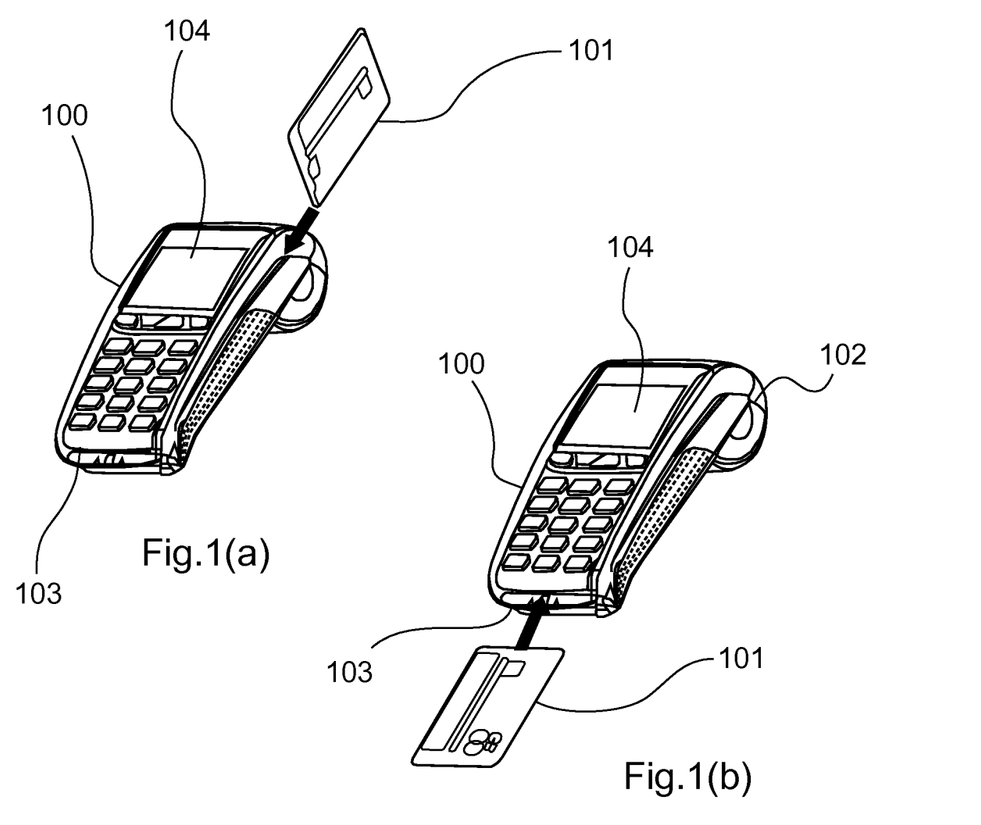

FIGS. 1(a) and 1(b) present a payment terminal according to the prior art in which the present invention can be implemented.

More specifically, such a terminal referenced 100 comprises a first communications module, called a contact module, as well as a second communications module, called a contactless module, used to communicate with a combined card referenced 101.

According to one embodiment, the first communications module comprises a magnetic read head and an interface of electrical contacts housed respectively in a first reading slot, referenced 102, and a second reading slot, referenced 103. In one variant (not shown), the first communications module comprises only a magnetic read head or interface of electrical contacts.

The second communications module, positioned in proximity to a display screen referenced 104 of the terminal is, for its part, compatible with at least any one of the following standards: ISO/CEI 18092, ISO/CEI 14443-1 to ISO/CEI 14443-4 and NDEF. Thus, the second communications module makes it possible, when the card 101 is positioned in proximity (about three to four centimeters) to this module, to make a contactless payment (which is speedier or more suited than another payment mode using the first communications module). The time for reading a contactless card by a payment terminal varies from 0.5 to 1 second.

Figure 1C:
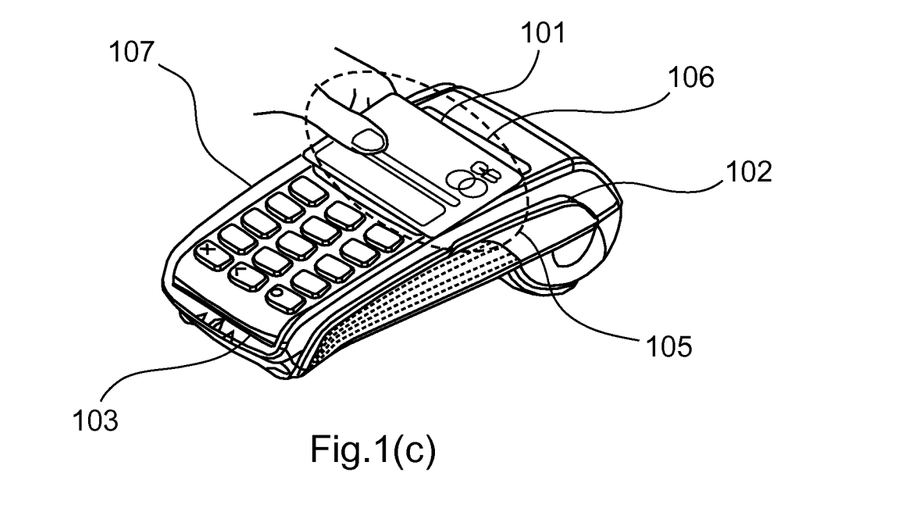

FIG. 1(c) presents another payment terminal according to the prior art comprising, in addition to the technical characteristics of the terminal presented in FIGS. 1(a) and 1(b), a line referenced 106 of light-emitting diodes positioned in proximity to a display screen in which the present invention can be implemented.

Such a line 106 is used to inform a user about the end of an electronic transaction when the second communications module has been used. Indeed, once a transaction using the second communications module has been made, the terminal 100 displays a "payment accepted" type of message on the screen 104 and simultaneously the light-emitting diodes light up and a sound signal is emitted out.

It must be noted that, for the transaction made via the second communications module to succeed, the user should position the card in a well specified zone referenced 105.

However, as mentioned in section 2 of the present document, various problems could arise, especially when the user passes in proximity to such a zone 105 whereas he wishes to position the card in the slot 102 or the slot 103.

The present invention seeks to overcome such problems. In particular, FIGS. 2(a), 2(b), 2(c), 2(d) and 2(e) present different embodiments of the present invention making it possible to overcome such problems.

Figure 2A:
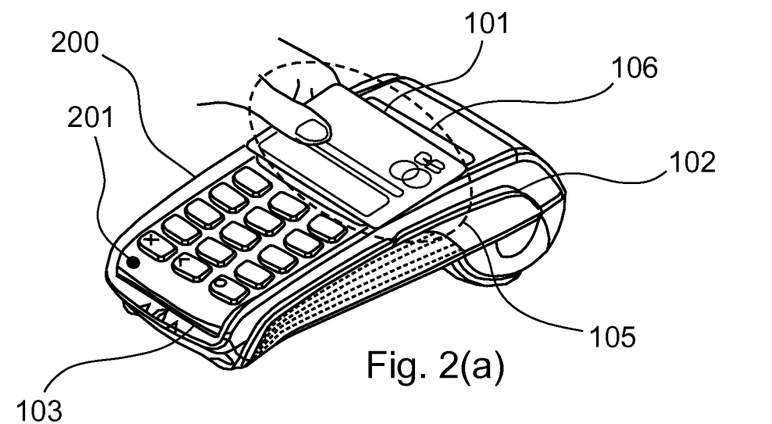

More specifically, FIG. 2(a) presents a terminal referenced 200 according to the present invention. Such a terminal 200 comprises the technical characteristics of a classic terminal (as mentioned with reference to FIGS. 1(a), 1(b) and/or 1(c)). Here below, such a terminal 200 shall be considered to include the same technical characteristics as those presented in the terminal of FIG. 1(c)). In addition, such a terminal 200 comprises at least one detection module comprising:

- at least one position sensor 201 of a card 101 delivering a piece of data representing a position of a card relative to said terminal; and
- at least one control terminal for controlling at least one communications terminal among the first and second communications modules, the control module being activated according to the piece of data representing the position of the card.

A position sensor 201 is positioned, in FIG. 2(a), in proximity to a reading slot 103 comprising an interface of electrical contacts. Thus, according to one embodiment of the invention, the position sensor 201 is positioned in proximity to a first communications module.

Thus, when the position sensor 201 detects a particular position of the card 101, it is then capable of controlling the first communications module and/or the second communications module. It must be specified that the position sensor 201, as understood in the invention, is not a sensor of presence of a card as in the prior-art devices. Indeed, in the prior art, it is sought to detect the presence of the card in proximity to the reader. Thus, in these prior-art techniques, it is of little importance that the card should be detected perpendicularly, in a profile view etc. All that the prior-art techniques seek to achieve is to detect the presence of the card. Now, it can be understood that detecting the presence of the card is unnecessary in the context of the problems and issues being resolved by the invention: it is sought to select, among several possible interfaces, that interface which the user of the transactional device wishes to use. Detecting the presence of the card in this context is of little utility. On the contrary, according to the invention, the position of the card relative to the terminal is detected. This position is a piece of information more relevant in the context of the problems raised by the prior art. This position of the card relative to the terminal makes it possible to select the interface to be used to perform the transaction. For example, with the invention, if the card is placed slantwise, or perpendicularly to the position sensor 201, it will not be considered to be in an appropriate position and the control module will not activate the interface associated with this sensor (for example the contactless interface). This is a subtle but extremely important point. As mentioned, according to the standards in force, when an interface is selected and when a transaction is initiated, it must be carried out within a given time. Now, with the detection techniques of the prior art, it is not certain that the transaction can be carried out within the allotted time because the card can then be detected even when it is wrongly positioned, thus causing a problem of transmission/reception of data coming from the card.

The invention, which offers a possibility of detection of the position of the card, ensures that the card is accurately placed relative to the terminal before the transaction is started. Besides, according to the invention, the control module activates the communications module with which it is directly associated: this means that once the card or the transactional device is detected in an accurate position, the transaction starts immediately. It is therefore not necessary to verify that this is first of all a card and that this card can respond to the demands of the terminal etc. These operations are lengthy, unnecessary and costly in terms of energy. On the contrary, in the invention, the transaction is started immediately.

Figure 2B:
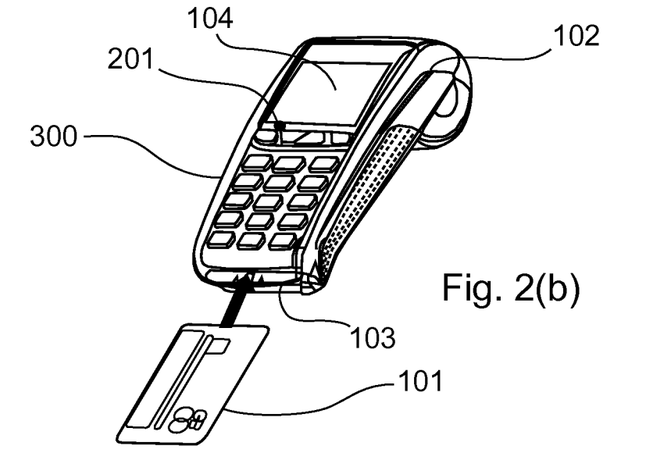

FIG. 2(b) presents another terminal, referenced 300, according to the present invention. Such a terminal 300 comprises the technical characteristics of a classic terminal (as mentioned with references to FIGS. 1(a), 1(b) and/or 1(c)).

Here below, such a terminal 300 is considered to have the same technical characteristics as those present in the terminal of FIG. 1(a)). The terminal 300 comprises at least one detection module comprising a position sensor 201 but positioned in proximity to the second communications module. Thus, through the positioning of the second communications module, such a position sensor 201 is positioned in proximity (at a distance of about a few centimeters at most) to a display screen 104.

Thus, in this embodiment, the terminal can initiate a transaction via the second communications module without waiting for the card to be manifested via the sending of a piece of data. In one particular embodiment of the invention (not shown), the terminal 100 furthermore comprises light-emitting diodes and/or infrared diodes (laid out similarly to the ones presented in FIG. 1(c)), these infrared diodes being special light-emitting diodes (LEDs). These diodes are associated with a visible or infrared light sensor, for example a phototransistor, to form a position sensor. Thus, this property can be used to detect the position of the card: when a card is in proximity to the receiver, the position and the proximity can be detected by reducing the ambient light and/or by reflection of the infrared light emitted by the LED or LEDs. If not, when the card is not accurately positioned or is not present, the current generated by the receiver informs the control module that the contactless interface should not be used.

In another embodiment, an infrared sensor is used, jointly with an infrared emitter. A sensor/emitter pair of this kind has several advantages. These advantages include the precision of the detection of position. Another advantage lies in the low consumption of energy of this pair (comparing with the contactless emitter). In one complementary embodiment, especially suited to the battery terminal, the infrared emitter/sensor pair is operated periodically, for example every tenth of a second. It is operated only for a few tens of microseconds. This periodic operation is sufficient to verify whether or not a card is placed in the right position. This periodic operation is advantageous because it further reduces the consumption of energy.

As an accessory, the previous embodiments emphasize two characteristics of the invention: firstly the fact that several sensors are used in conjunction with a given interface to refine the detection of the position of a transactional device; secondly the fact that the sensors can be used either on a main basis or on a complementary basis.

Figure 2C:
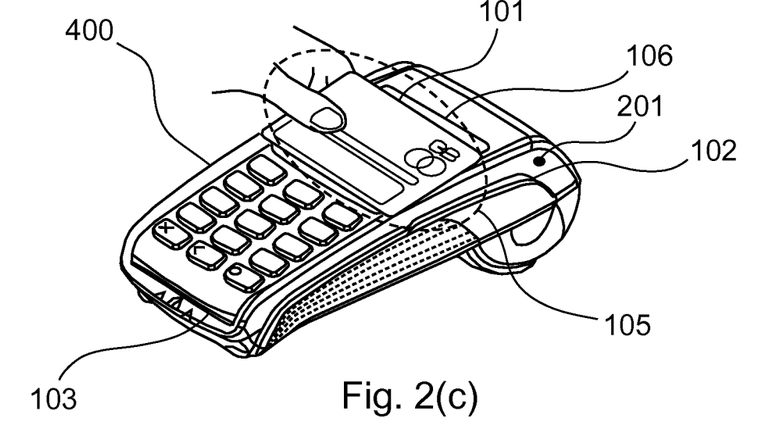

FIG. 2(c) presents another terminal referenced 400 according to the present invention. Such a terminal 400 comprises the technical characteristics of a classic terminal (as mentioned with reference to FIGS. 1(a), 1(b) and/or 1(c); here below, a terminal 400 is considered to include the same technical characteristics as those presented in the terminal of FIG. 1(c)). The terminal 400 comprises at least one detection module comprising a position sensor 201 positioned in proximity to a reading slot 102 comprising a contact interface corresponding to an electromagnetic read head. Thus, the position sensor 201, according to one embodiment of the invention, is positioned in proximity to a first communications module.

Figures 2D, 2E:
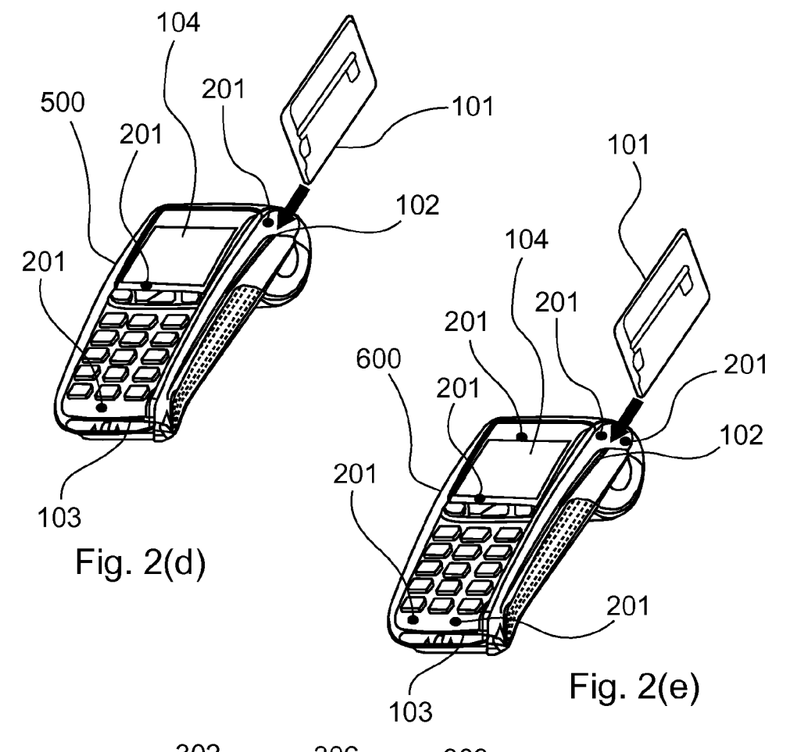

FIG. 2(d) presents another terminal, referenced 500, according to the present invention. Such a terminal 500 includes the technical characteristics of a classic terminal (as mentioned with reference to FIGS. 1(a), 1(b) and/or 1(c); here below, such a terminal 500 is considered to include the same technical characteristics as those present in the terminal of FIG. 1(a)). The terminal 500 comprises three sensors 201, positioned respectively in proximity to a reading slot 102 comprising a contact interface corresponding to this electromagnetic read head, in proximity to a reading slot 103 comprising an interface of electrical contacts, and in proximity to the second communications module. Thus, the sensors 201, according to one embodiment of the invention, are positioned in proximity to each of the first and second communications modules.

FIG. 2(e) presents another terminal, referenced 600, according to the present invention. Such a terminal 600 has the technical characteristics of a classic terminal (as mentioned with reference to FIGS. 1(a), 1(b) and/or 1(c); here below, such a terminal 600 shall be considered to comprise the same technical characteristics as those present in the terminal of FIG. 1(a)). The terminal 600 comprises a detection module comprising a plurality of sensors 201, positioned by pairs respectively in proximity to a reading slot 102 comprising a contact interface corresponding to an electromagnetic read head, in proximity to a reading slot 103 comprising an interface of electrical contacts, and in proximity to the second communications module. Thus, by increasing the number of sensors, and by choosing a particular topology enabling the detection in an optimal manner of a position of a transactional device, such a terminal prevents the use of communications means that are not compatible with the position of a transactional device.

Thus, according to the present invention, when a user brings a card closer towards the reading slot 102, the sensors 201 positioned in proximity to such a reading slot 102 then detect a position inducing a choice of the use of reading by magnetic strip. Thus, according to one embodiment, the control module associated with such sensors can turn off the power supply to the second communications module as well as the power supply to the electrical contacts interface included in the reading slot 103, while at the same time preparing data on the transaction that will take place. Thus, the overall time of such a transaction is reduced.

Figure 3:
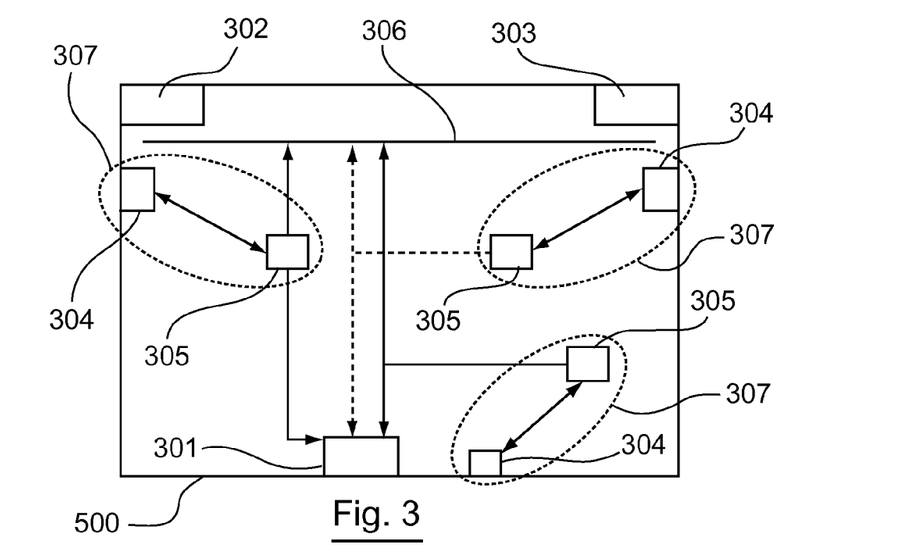
FIG. 3 schematically presents the diagram of a terminal according to the present invention.

FIG. 3 schematically presents the structure, of a terminal according the present invention.

More specifically, FIG. 3 presents the terminal 500 described with reference to FIG. 2(d). In such an embodiment, the terminal 500 comprises a microprocessor with which there is associated firstly a random-access memory, for example by means of a bus, and secondly a non-volatile memory (for example of the EEPROM type) for example through a bus.

The terminal can exchange data with external devices (i.e. transactional devices such as a contactless card or an NFC device) using a first communications module and a second communications module. More specifically, the first communications module, referenced 306, comprises a magnetic read head referenced 302 as well as an electrical contacts interface (for example compliant with the ISO/IEC 7816 standard), referenced 303. The second communications module, referenced 301, can be compatible with at least any one of the following standards: ISO/CEI 18092, ISO/CEI 14443-1 to ISO/CEI 14443-4 and NDEF.

In one embodiment, detection modules referenced 307 each comprise a sensor, referenced 307, of a position of a transactional device, each sensor being positioned in the configuration presented in FIG. 2(d), as well as a control module 305. Such a control module 305 is connected, via buses, to at least one sensor, and for example to the first and second communications modules, thus enabling direct control over the communications modules as a function of the data obtained via a sensor 304.

According to one variant, a detection module can comprise a plurality of sensors and a plurality of control modules.

According to one variant, the terminal comprises a single module for controlling all the communications modules, and a plurality of sensors distributed in proximity to the communications modules, the control module being in a state of interaction with the totality of the sensors.

In another embodiment, an application that is executed on a terminal coordinates the working of the control modules.

More generally, whatever the embodiment, the invention consists in adding a transactional device position sensor in the read zone of the communications modules. An optical sensor can be used and makes it possible, as compared with other detection techniques, to validate the accurate positioning of the card and not only the proximity of this card. This type of optical sensor makes it possible to:
- detect the position of the transactional device (inter alio through the shape recognition means so as to avoid mistaking the position of a hand, or other object, for the position of a transactional device).
- put into action the appropriate communications module (for example the contactless reader) only when it is necessary.
- bring about cohabitation between the different types of transactional device readers: magnetic strips, chips with contacts, contactless chips
- achieve significant gain in the autonomy of the portable terminals equipped with a contactless card reader.

In one variant, a control module can also control a sensor in order to specify the position of the transactional device that has been detected for a first time.

In another embodiment, the invention also relates to a method for detecting a position of a transactional device. According to the invention, such a method comprises:
- at least one step for detecting a position of a transactional device, delivering a piece of data representing a position of a transactional device relative to the terminal; and
- a step for controlling at least one communications module among the communications modules of the terminal, the at least one control module activating the communications module as a function of the piece of data representing the position of said transactional device.

According to one particular embodiment, the step for detecting is implemented periodically, in activating and deactivating the sensor at regular intervals in order to verify the position, relative to the terminal, of a transactional device if any. This periodic implementation can be done about ten times per second for a very short time span, for example a span of about ten to about a hundred microseconds.

Although the present disclosure has been described with reference to one or more examples, workers skilled in the art will recognize that changes may be made in form and detail without departing from the scope of the disclosure and/or the appended claims.

The invention claimed is:

1. A terminal comprising:
   communications elements configured to communicate with a personal device for carrying out transactions, called a transactional device, said communications elements comprising:
   a first communications module comprising a reading interface for reading by contact, and
   a second communications module comprising a contactless reading interface;
   a detection module comprising:
   at least one transactional device position sensor delivering a piece of data representing a position of a transactional device relative to said terminal; and
   at least one control module controlling said first and second communications modules, said at least one control module activating said first communications module or said second communication module according to said piece of data representing said position of said transactional device.

2. The terminal according to claim 1, wherein said sensor comprises at least one optical sensor.

3. The terminal according to claim 1, wherein the terminal comprises a plurality of detection modules, each detection module comprising at least one sensor, which is adapted to the detection of the position of a transactional device according to predetermined constraints related to said first or second communications module with which said detection module is associated.

4. The terminal according to claim 3, wherein each detection module of said plurality of detection modules is capable of controlling the first or second communications module associated with said detection module.

5. The terminal according to claim 1, wherein the at least one transactional device position sensor of the detection module is associated with said second communications module and is positioned on a surface of a screen of said terminal.

6. The terminal according to claim 1, wherein said first communications module comprises at least one of a magnetic read head or an interface of electrical contacts.

7. The terminal according to claim 1, wherein said second communications module is compatible with at least any one of the following standards: ISO/CEI 18092, ISO/CEI 14443-1 to ISO/CEI 14443-4 and NDEF.

8. The terminal according to claim 1, wherein said terminal is a payment terminal and said at least one control module can initiate an electronic transaction.

9. The terminal according to claim 1, wherein said at least one control module enables a reduction or increase in electrical consumption of one of said communications modules.

10. The terminal according to claim 1, wherein said at least one control module enables activating or stopping a module of said first and second communications modules.

11. The terminal of claim 1, wherein:
   the at least one transactional device position sensor delivers a piece of data representing the position of a transactional device relative to a first position associated with the first communications interface and a second position associated with the second communications interface.

12. The terminal of claim 11, wherein the at least one transactional device position sensor comprises:
   a first transactional device position sensor delivering a piece of data representing the position of the transactional device relative to the first position associated with the first communications interface; and
   a second transactional device position sensor delivering a piece of data representing the position of the transactional device relative to the second position associated with the second communications interface.

13. A terminal comprising:
   communications elements configured to communicate with a personal device for carrying out transactions, called a transactional device, said communications elements comprising:
   a first communications module comprising a reading interface for reading by contact, and
   a second communications module comprising a contactless reading interface;
   a detection module comprising:
   a first transactional device position sensor delivering a piece of data representing the position of the transactional device relative to the first position associated with the first communications interface; and a second transactional device position sensor delivering a piece of data representing the position of the transactional device relative to the second position associated with second communications interface;

at least one control module controlling said first and second communications modules, said at least one control module activating said first communications module or said second communication module according to said pieces of data representing said position of said transactional device.

\* \* \* \* \*